(12) United States Patent
Hatanaka (10) Patent No.: US 8,152,690 B2
(45) Date of Patent: Apr. 10, 2012

(54) ENGINE REVOLUTIONS CONTROL DEVICE OF WORKING VEHICLE AND METHOD

(75) Inventor: Yasushi Hatanaka, Komatsu (JP)

(73) Assignee: Komatsu Ltd., Tokyo (JP)

( * ) Notice: Subject to any disclaimer, the term of this patent is extended or adjusted under 35 U.S.C. 154(b) by 1002 days.

(21) Appl. No.: 12/083,565

(22) PCT Filed: Sep. 20, 2006

(86) PCT No.: PCT/JP2006/318616
§ 371 (c)(1),
(2), (4) Date: Apr. 14, 2008

(87) PCT Pub. No.: WO2007/043289
PCT Pub. Date: Apr. 19, 2007

(65) Prior Publication Data
US 2009/0247356 A1    Oct. 1, 2009

(30) Foreign Application Priority Data
Oct. 14, 2005    (JP) .................................. 2005-300265

(51) Int. Cl.
*B60W 10/04*    (2006.01)
*F16H 61/48*    (2006.01)
(52) U.S. Cl. ............................ 477/111; 477/110; 477/57
(58) Field of Classification Search .................. 477/107, 477/110, 111, 57
See application file for complete search history.

(56) References Cited

U.S. PATENT DOCUMENTS
4,583,613 A    4/1986    Nakayama
(Continued)

FOREIGN PATENT DOCUMENTS
CN    2052730 U    2/1990
(Continued)

OTHER PUBLICATIONS

Chinese Office Action (with English translation) issued Jan. 15, 2010 in corresponding Chinese Patent Application No. 200680037484.0.

(Continued)

*Primary Examiner* — Roger Pang
(74) *Attorney, Agent, or Firm* — Wenderoth, Lind & Ponack, L.L.P.

(57) ABSTRACT

To provide an engine revolutions control device of a working vehicle that the braking effect can be obtained by the low-speed speed gear as expected by the operator at the time of forward/reverse changeover and the durability of the clutch can be enhanced without increasing the capacity of the clutch. When the low-speed gear change range suitable for the work is selected by the shift range lever and the speed gear clutch corresponding to the maximum speed gear of the selected gear change range in the individual speed gear clutches is engaged, the throttle amount upper limit value which limits the revolutions of the engine so to have the upper limit vehicle speed or less corresponding to the maximum speed gear is determined, and it is output as a throttle amount correction command signal to an engine controller. The engine controller compares the content of the throttle correction command signal input from the transmission controller, namely the throttle amount upper limit value with a throttle amount as a depressing operation amount of the accelerator pedal, generates as the corrected throttle amount the smaller throttle amount and controls the engine 1 so that the target revolutions according to the corrected throttle amount can be obtained.

8 Claims, 4 Drawing Sheets

U.S. PATENT DOCUMENTS

| | | | |
|---|---|---|---|
| 5,027,770 A | | 7/1991 | Yano et al. |
| 5,161,503 A | | 11/1992 | Yano et al. |
| 5,389,051 A | | 2/1995 | Hirate et al. |
| 5,588,515 A | | 12/1996 | Toyama et al. |
| 5,679,094 A | * | 10/1997 | Nakamura et al. ............ 477/111 |
| 6,181,020 B1 | * | 1/2001 | Uchida et al. ............... 290/40 C |
| 6,240,356 B1 | | 5/2001 | Lapke |
| 6,440,038 B1 | * | 8/2002 | Holloway ....................... 477/54 |
| 7,637,845 B2 | * | 12/2009 | Strashny et al. ............. 477/108 |

FOREIGN PATENT DOCUMENTS

| | | |
|---|---|---|
| JP | 02-199356 | 8/1990 |
| JP | 2-227561 | 9/1990 |
| JP | 2875571 | 3/1993 |
| JP | 6-92162 | 4/1994 |
| JP | 2734817 | 4/1998 |

OTHER PUBLICATIONS

Swedish Patent Office (with English translation) issued Dec. 11, 2008 in Swedish Patent Application No. 0800795-7.

International Search Report issued Nov. 28, 2006 in the International (PCT) Application of which the present application is the U.S. National Stage.

Japanese Office Action (with English Translation) issued May 24, 2011 in corresponding Japanese Application No. 2005-300265.

* cited by examiner

ENGINE REVOLUTIONS CONTROL DEVICE OF WORKING VEHICLE AND METHOD

TECHNICAL FIELD

The present invention relates to a working vehicle which is moved as its engine power is transmitted to the transmission, and more particularly to an apparatus and method of controlling engine revolutions.

BACKGROUND ART

A power transmission path of the engine of a wheel loader is provided with a transmission having a forward clutch, a reverse clutch, and respective speed gear clutches.

For example, when a working vehicle is moving backward and a forward/reverse selecting lever which is provided at a driver seat is operated to a forward position, a gear change command is generated, the forward clutch is selected, switching is made from the reverse clutch before the gear change to the selected forward clutch after the gear change, the engine power is transmitted to the selected gear-changed forward clutch of the transmission to drive the drive wheels, and the vehicle is changed to move from reverse to forward.

The wheel loader often performs V-shape loading. The V-shape loading is an operation pattern that the wheel loader travels forward to a natural ground to excavate earth and sand, travels backward after the excavation to reach a turning point, travels forward to load the earth and sand on a hopper or a dump truck and travels the same route repeatedly.

At the time of the V-shape loading, the wheel loader is driven at a low speed and frequently switched to change from reverse running to forward running or from forward running to reverse running.

The troublesome forward/reverse changeover at low-speed running is performed not only at the time of the V-shape loading but also at the time of loading a cargo on a ship by the wheel loader.

When working at a low-speed forward/reverse switching as described above, a low-speed gear range suitable for the work is selected by a shift range lever. For example, the wheel loader adopting a transmission consisting of first to fourth speed gears selects a shift range "2" which is a low-speed gear range to perform low-speed working. When the shift range "2" is selected, automatic gear change is performed with the second speed gear determined as the maximum speed gear in the shift range.

When the shift range "2" is selected and the vehicle speed exceeds the upper limit vehicle speed of the second speed gear which is the maximum speed gear of the shift range "2", automatic gear change is performed to a speed gear, e.g., a third speed gear, higher than the maximum speed gear (second speed gear) in the shift range in order to protect the clutch of the transmission.

Patent Literature 1 below describes an invention which produces a braking force of the brakes in conjunction with engagement of the clutch at a time of forward/reverse changeover to prevent a gear change shock produced by the clutch.

Patent Literature 1: JP-A 06-92162

SUMMARY OF THE INVENTION

Problems to be Solved by the Invention

At a time of traveling down a slope or the like and not working at a low speed, switching to a speed gear (third speed gear) higher than the maximum speed gear (second speed gear) in the shift range "2" does not cause a particular problem.

But, at a time of working to perform the V-shape loading or the like, an operator often performs the forward/reverse changeover in expectation of a braking effect by a low-speed gear (second speed gear) without depressing the brake pedal. It is because the braking effect absorbed by the transmission becomes higher as the speed gear is lower. If a shift up to the third speed gear, which is a speed gear of a higher speed, is made despite the intension of the operator even if the forward/reverse changeover is performed in expectation of the braking effect, the braking effect is weakened, and the expected braking effect cannot be obtained. Therefore, the forward/reverse changeover is performed without sufficiently decelerating the vehicle, the vehicle behaves despite the intension of the operator, and the work cannot be performed efficiently.

Here, when the shift range "2" is selected at the time of working to make the forward/reverse changeover at a low speed, control may be made not to cause an automatic gear change to the speed gear (third speed gear) of a higher speed than the maximum speed gear (second speed gear) in the shift range in order to enhance the braking effect. But, if the vehicle speed increases during the work, the vehicle is in a running state at the second speed gear regardless of the vehicle speed region of the third speed gear, the revolutions of the forward clutch or the reverse clutch becomes excessive, and a heat generation amount of the clutch exceeds an acceptable amount. Therefore, the clutch has an excessive heat load, and the durability of the clutch is adversely affected. To avoid it, the clutch must be made to have a large capacity to deal with the excessive heat load, the clutch has a large size and the cost is increased.

The present invention has been made under the circumstances described above and provides the braking effect by the low-speed speed gear as expected by the operator at the time of forward/reverse changeover and also enhances the durability of the clutch without increasing the capacity of the clutch.

The invention described in the Patent Literature 1 above generates a braking force by a brake means different from the clutch at the time of clutch engagement, and it is essentially different from the present invention which enhances a braking effect by the clutch itself at the time of clutch engagement.

Means for Solving the Problems

A first invention is an engine revolutions control device of a working vehicle that runs with power of an engine transmitted to a transmission, wherein:

the transmission includes:
a forward clutch for selecting a forward running gear,
a reverse clutch for selecting a reverse running gear, and
speed gear clutches each for selecting each speed gear; and
the engine revolutions control device comprises:
gear change range selection means for selecting a gear change range of a speed gear; and
engine revolutions control means, when a low-speed gear change range is selected by the gear change range selection means and a speed gear clutch corresponding to a maximum speed gear of the selected gear change range in the speed gear clutches is engaged, for limiting the revolutions of the engine to an upper limit vehicle speed or less corresponding to the maximum speed gear of the selected gear change range.

A second invention is the engine revolutions control device of a working vehicle according to the first invention, wherein:

the working vehicle is provided with a torque converter and a lockup clutch which is parallel to the torque converter between the engine and the transmission, and the engine revolutions control means limits the revolutions of the engine to the upper limit vehicle speed or less corresponding to the maximum speed gear when it is instructed to put the lockup clutch into a non-engaged state, the low-speed gear change range is selected by the gear change range selection means and the speed gear clutch corresponding to the maximum speed gear of the selected gear change range is engaged among the speed gear clutches.

A third invention is the engine revolutions control device of a working vehicle according to the first invention, wherein the low-speed gear change range suitable for a work is a gear change range which has a second speed gear as the maximum speed gear.

A fourth invention is the engine revolutions control device of a working vehicle according to the second invention, wherein the low-speed gear change range suitable for a work is a gear change range which has a second speed gear as the maximum speed gear.

According to the present invention, when the low-speed gear change range (shift range "2") suitable for the work is selected by a shift range lever 8 and a speed gear clutch (second speed clutch 22) corresponding to the maximum speed gear (second speed gear) of the selected gear change range (shift range "2") in speed gear clutches 21 to 24 is engaged, a throttle amount upper limit value Sm which limits the number of revolutions Ne of an engine 1 so as to have an upper limit vehicle speed Ntm or less corresponding to the maximum speed gear (second speed gear) is determined, and it is output as a throttle amount correction command signal to an engine controller 60.

Figure 4A:
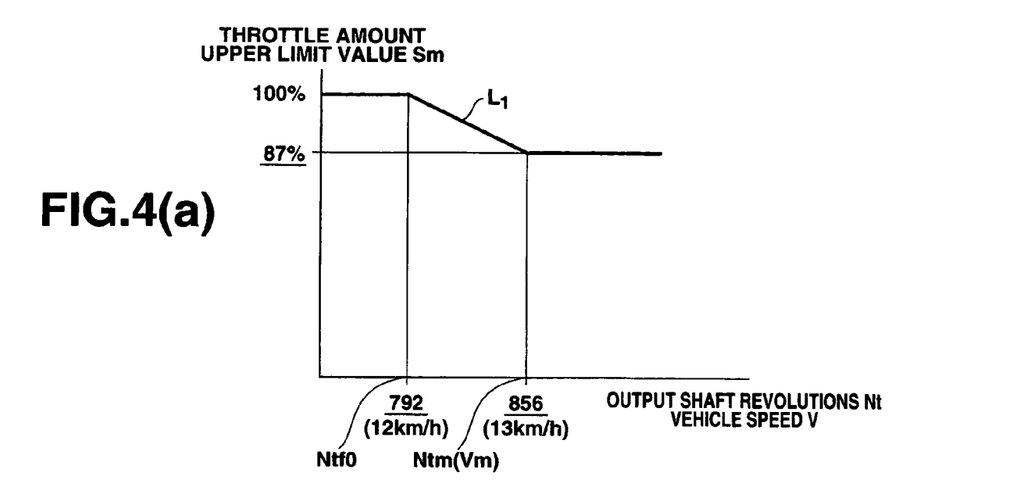

For example, at a forward second speed "F2", the throttle upper limit value Sm corresponding to the present detected number of revolutions Nt (present vehicle speed V) of a vehicle speed sensor 10 is read based on a correspondence relationship L1 shown in FIG. 4(*a*) and output as a throttle amount correction command signal to the engine controller 60. The engine controller 60 compares the content of the throttle correction command signal input from the transmission controller 50, namely the throttle amount upper limit value Sm with a throttle amount S as a depressing operation amount of an accelerator pedal 11, generates the smaller throttle amount as a corrected throttle amount S' and controls the engine 1 so that the target revolutions according to the corrected throttle amount S' can be obtained.

Figure 2:
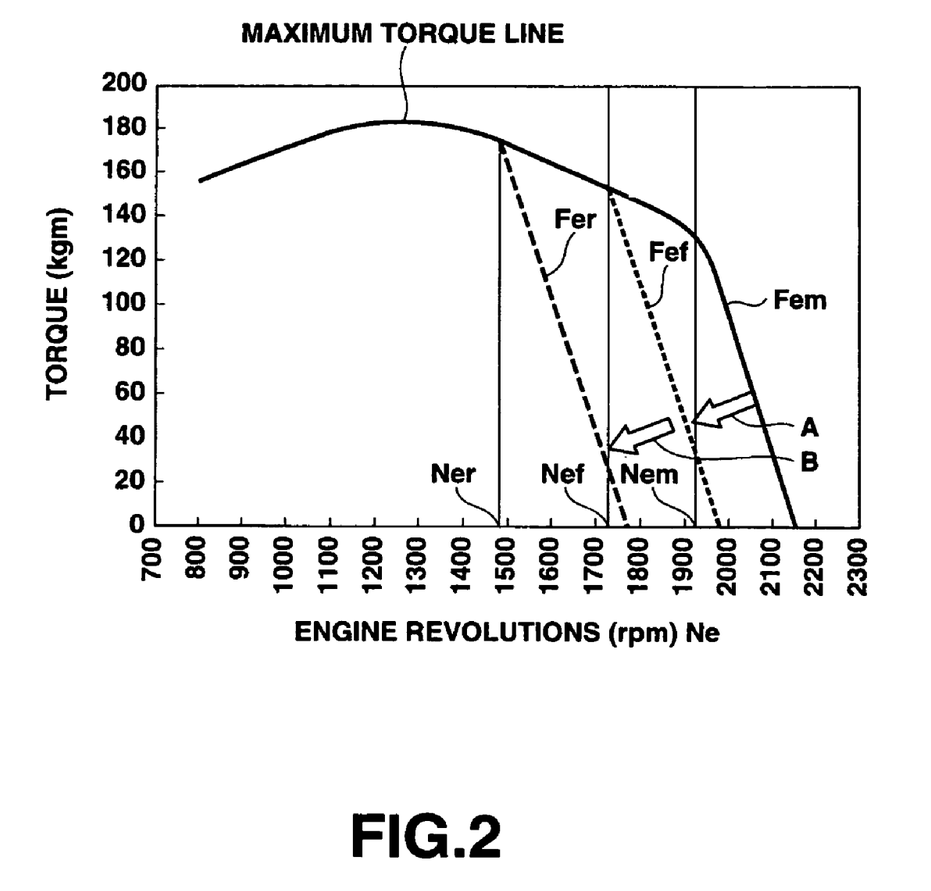
FIG. 2 is a diagram showing a torque diagram of an engine.

As a result, when a wheel loader 100 is running at the forward second speed "F2" as shown in FIG. 2 as indicated by an arrow A according to the characteristic L1, the engine target revolutions are gradually decreased as the vehicle speed V is increased and when V reaches an upper limit vehicle speed Vm, the revolutions are limited to the number of revolutions Nef which is 87% of the maximum number of revolutions Nem. Therefore, even if the accelerator pedal 11 is depressed to 100%, the number of revolutions of the engine 1 is limited to the number of revolutions Nef which is 87% of the maximum number of revolutions Nem, and the vehicle speed V does not exceed the upper limit vehicle speed Vm of the second speed gear.

Thus, since the engine revolutions are controlled such that the vehicle speed V does not exceed the upper limit vehicle speed Vm of the second speed gear, even if a forward/reverse selecting lever 7 is operated at the time of the V-shape loading to switch from the forward running to the reverse running, the shift up from the forward second speed "F2" to a reverse third speed "R3" is not made, and a gear change is made to a reverse second speed "R2" while keeping the same speed gear. Similarly, even if the forward/reverse selecting operation lever 7 is operated at a time of the V-shape loading to change from the reverse running to the forward running, the shift up from the reverse second speed "R2" to a forward third speed "F3" is not made, but the gear change is made to the forward second speed "F2" while maintaining the same speed gear.

Thus, the braking effect by the low-speed gear (second speed gear) can be obtained as expected by the operator, and the work can be made efficiently and swiftly. And, since the engagement changeover between a forward clutch 25 and a reverse clutch 26 is not performed when the vehicle speed V exceeds the upper limit vehicle speed Vm of the second speed gear, a heat load applied to the clutch is decreased, the durability of the clutch is improved, the clutch capacity can be decreased, the clutch is made compact, and the cost is reduced.

A fact that a lockup clutch 4 is off may be one condition of starting the control according to the present invention (the second invention), and this starting condition can be omitted appropriately if a working vehicle is not provided with the lockup clutch 4 (the first invention).

A fact that the shift range is positioned at "2" may be determined as one condition of starting the control according to the present invention (the third invention). A reduction gear ratio or the like is different depending on the type of the working vehicle, and when the V-shape loading is performed, another shift range may be used. Therefore, positioning in another shift range may be determined as a condition for initiating the throttle amount upper limit control. In other words, positioning in a shift range used for a work at a low speed may be determined as a condition for initiating the throttle amount upper limit control (the first invention).

A fifth invention to an eighth invention are inventions of the methods corresponding to the first invention to the fourth invention.

DETAILED DESCRIPTION OF THE INVENTION

Embodiments of the present invention are described below with reference to the figures.

Figure 1:
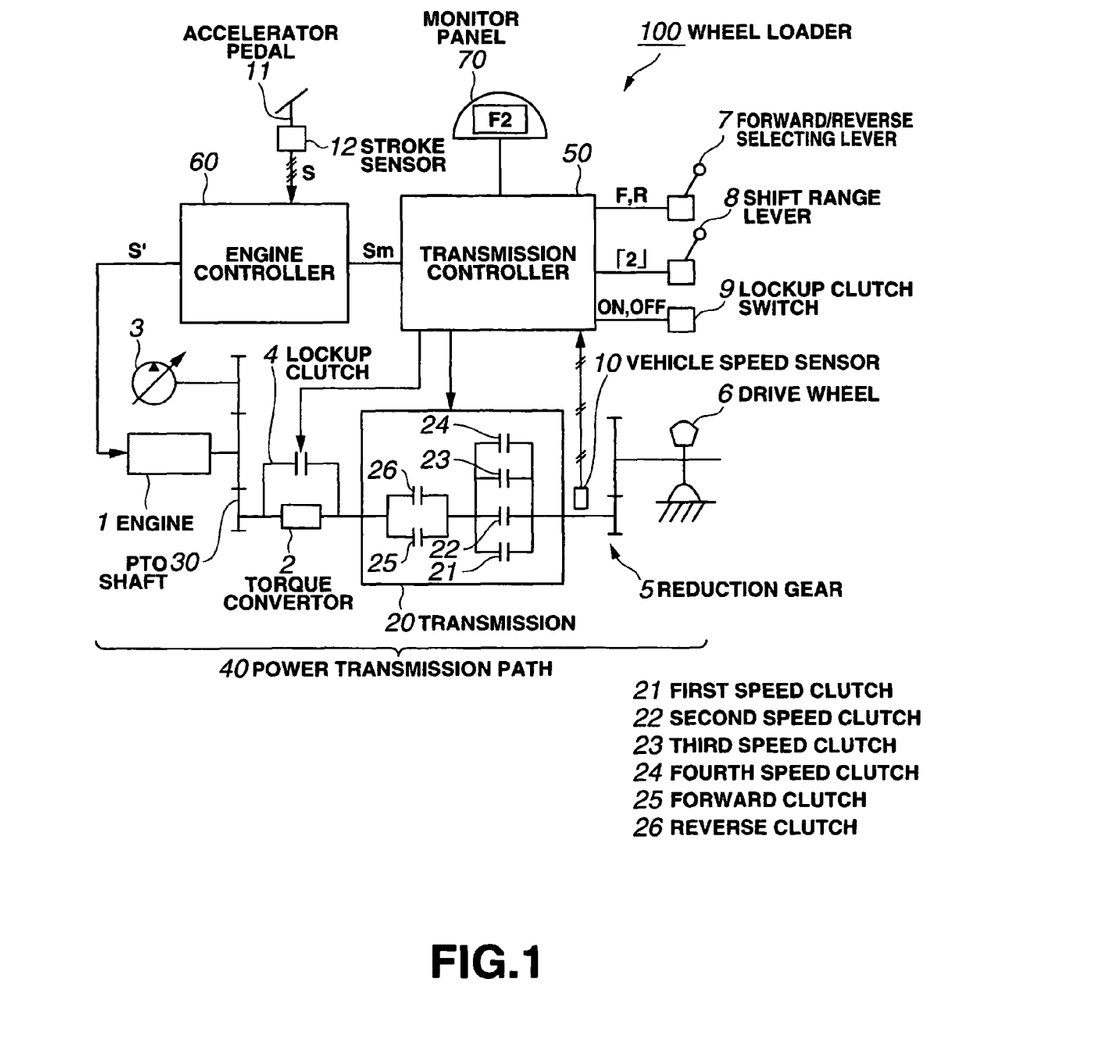
FIG. 1 is a block diagram of a structure of an engine revolutions control device of a working vehicle according to an embodiment, showing portions according to the present invention in connection with a structure of a wheel loader.

FIG. 1 is a block diagram of a structure of an engine revolutions control device of a working vehicle according to an embodiment, showing portions according to the present invention in connection with a structure of a wheel loader.

As shown in FIG. 1, a power transmission path 40 of the engine 1 of the wheel loader 100 is provided with a transmission 20 which has a first speed clutch 21, a second speed clutch 22, a third speed clutch 23 and a fourth speed clutch 24 which correspond to a forward clutch 25 corresponding to a forward running gear, a reverse clutch 26 corresponding to a reverse running gear, speed gear clutches corresponding to individual speed gears, namely a first speed gear, a second speed gear, a third speed gear and a fourth speed gear. Each clutch is configured of a wet-type multi-plate hydraulic clutch.

The output shaft of the engine 1 of the wheel loader 100 is coupled to a PTO shaft 30. The PTO shaft 30 is coupled to a torque converter 2 and also to a hydraulic pump 3. The torque converter 2 is provided with a lockup clutch 4, which locks up the torque converter 2, in parallel with and along the power transmission path 40.

The output of the engine 1 is partially transmitted to drive wheels 6 through the PTO shaft 30, the torque converter 2 or the lockup clutch 4, the transmission 20, and a reduction gear (differentiation gear) 5. And, the rest of the output of the engine 1 is transmitted to the hydraulic pump 3 through the PTO shaft 30. Thus, the hydraulic pump 3 is driven, a pressure oil discharged from the hydraulic pump 3 is transmitted to a hydraulic actuator via an operation valve, to operate a work machine or the like.

A hydraulic pressure (clutch pressure) of the pressure oil which is supplied to the individual clutches 21 to 26 of the transmission 20 or discharged from the individual clutches 21 to 26 is controlled. Thus, a frictional engagement force between an input side and an output side of the individual clutches 21 to 26 is controlled. Similarly, a hydraulic pressure (clutch pressure) of the pressure oil which is supplied to the lockup clutch 4 or discharged from the lockup clutch 4 is controlled. Thus, the frictional engagement force between the input side and the output side of the lockup clutch 4 is controlled. An engaging operation (connecting operation) and a non-engaging operation (disconnecting operation) between the individual clutches 21 to 26 of the transmission 20 and the lockup clutch 4 are controlled by the transmission controller 50.

The driver seat of the wheel loader 100 is provided with the forward/reverse selecting lever 7 as an operation means for selecting a forward running gear (the forward clutch 25) or a reverse running gear (the reverse clutch 26) according to an operation position.

A forward/reverse position signal indicating an operation position (forward position "F" or reverse position "R") of the forward/reverse selecting operation lever 7 is input to the transmission controller 50.

The driver seat of the wheel loader 100 is provided with the shift range lever 8 for selecting a gear change range of the speed gear according to the operation position. Selection positions of the shift range lever 8 include, for example, a shift range "1", a shift range "2", a shift range "3" and a shift range "4". The shift range "2" is a low-speed shift range position that shifting to a first speed gear and a second speed gear is automatically made according to the vehicle speed, and the second speed gear is determined as a maximum speed gear. A shift range signal indicating an operation position (shift range "1", "2", "3" or "4") of the shift range lever 8 is input to the transmission controller 50. At a time of low-speed working when the troublesome forward/reverse changeover is performed, such as the V-shape loading, the shift range lever 8 is normally operated to the shift range "2".

A monitor panel 70 is provided at the driver seat.

According to the input forward/reverse position signal and the shift range signal, the transmission controller 50 outputs a display signal for displaying the present operation position (forward position "F" or reverse position "R") of the forward/reverse selecting operation lever 7 and the present operation position (shift range "1", "2", "3" or "4") of the shift range lever 8 on the monitor panel 70 in order to display the above operation position on the monitor panel 70.

According to the input forward/reverse position signal and the shift range signal, the transmission controller 50 outputs a forward/reverse clutch pressure command signal for selecting and engaging either the forward clutch 25 or the reverse clutch 26 of the transmission 20 and outputs a speed gear clutch pressure command signal for selecting and engaging any of the speed gear clutches 21 to 24 of the transmission 20.

For example, when the forward/reverse position signal for switching from the reverse to the forward is input to the transmission controller 50 while the wheel loader 100 is performing reverse running (reverse second speed "R2") in the second speed gear, the transmission controller 50 outputs the forward/reverse clutch pressure command signal for selecting the forward clutch 25 according to a prescribed oil pressure change pattern to decrease the clutch pressure of the reverse clutch 26 before the gear change and also to increase the clutch pressure of the selected forward clutch 25 after the gear change, thereby putting the reverse clutch 26 in a non-engaged state and engaging the forward clutch 25. Thus, the power of the engine 1 is transmitted to the drive wheels 6 through the selected gear changed forward clutch 25 of the transmission 20 and the speed reducer 5 to drive the drive wheels 6. The wheel loader 100 is switched from the reverse running to the forward running and caused to perform forward running in the second speed gear (forward second speed "F2").

It can be recognized which of the forward clutch 25 and the reverse clutch 26 is selected and engaged by the transmission 20, namely whether an actual running gear is forward or reverse, according to the forward/reverse clutch pressure command signal being produced by the transmission controller 50. Similarly, it can be recognized which of the individual speed gear clutches 21 to 24 is selected and engaged by the transmission 20, namely whether the actual speed gear is the first speed gear, the second speed gear, the third speed gear or the fourth speed gear, according to the speed gear clutch pressure command signal being produced by the transmission controller 50.

The driver seat of the wheel loader 100 is provided with a lockup clutch switch 9 for turning on (engagement) or off (non-engagement) the lockup clutch 4. The lockup clutch switch 9 is normally turned off at the time of low-speed working when switching between forward and reverse is frequently performed, such as V-shape loading. An operation signal of the lockup clutch switch 9 is input to the transmission controller 50. When the condition of the operation signal of the lockup clutch switch 9 is off, the transmission controller 50 outputs a lockup clutch pressure command signal for putting the lockup clutch 4 in a non-engaged state. Therefore, when the lockup clutch switch 9 is off, the power of the engine 1 is transmitted to the drive wheels 6 through the torque converter 2, the transmission 20 and the reduction gear 5. When the lockup clutch switch 9 is on and the vehicle speed reaches a prescribed vehicle speed or more, the transmission controller 50 outputs a lockup clutch pressure command signal for engaging the lockup clutch 4. Thus, when the lockup clutch switch 9 is on and the vehicle has a prescribed vehicle speed or more, the power of the engine 1 is transmitted to the drive wheels 6 through the lockup clutch 4, the transmission 20 and the reduction gear 5.

The output shaft of the transmission 20 is provided with the vehicle speed sensor 10 for detecting the number of revolutions Nt of the transmission output shaft. A signal indicating the number of revolutions Nt detected by the vehicle speed sensor 10 is input to the transmission controller 50. The transmission controller 50 converts the input number of revolutions Nt of the transmission output shaft into a vehicle body speed V of the wheel loader 100.

The driver seat of the wheel loader 100 is provided with an accelerator pedal 11. The accelerator pedal 11 is depressed by the operator, and a depressing operation amount or a throttle amount S is detected by a stroke sensor 12 which is provided to the accelerator pedal 11, and a signal indicating the throttle amount S is input to the engine controller 60.

A throttle correction command signal (throttle amount upper limit value Sm) for correction of the throttle amount S is input from the transmission controller 50 to the engine controller 60 as described later. The engine controller 60 controls the engine 1 by correcting the throttle amount S corresponding to the depressing operation amount of the accelerator pedal 11 by the throttle correction command signal (throttle amount upper limit value Sm) and outputting a command signal corresponding to a corrected throttle amount S' to a governor so that the target revolutions corresponding to the throttle amount S' can be obtained.

The engine 1 is a diesel engine, and the engine power is controlled by adjusting a fuel amount to be injected into the cylinders. The adjustment is performed by controlling the governor which is attached to the fuel injection pump of the engine 1. As the governor, a governor of an all-speed control type is generally used, and the engine revolutions and the fuel injection amount are adjusted depending on a load to obtain the target revolutions according to the throttle amount S'. In other words, the governor increases or decreases the fuel injection amount to eliminate a deviation between the target revolutions and the actual engine revolutions.

FIG. 2 shows a torque diagram of the engine 1. The horizontal axis of FIG. 2 represents an engine revolutions Ne, and the vertical axis represents an engine torque.

In FIG. 2, a region defined by a maximum torque line indicates performance producible by the engine 1. The governor controls the engine 1 so that it does not reach an exhaust limit beyond the maximum torque line, and the engine revolutions Ne do not become over-revolutions beyond high-idle revolutions.

Here, when a command indicating that the throttle amount S' is 100% is output from the engine controller 60, the target revolutions of the engine 1 are set to the maximum target revolutions Nem corresponding to a rated point, and the governor executes the speed control on a maximum speed regulation line Fem which connects the rated point and a high-idle point.

When a command indicating that the throttle amount S' is 87% is output from the engine controller 60, the target revolutions of the engine 1 are set to the revolutions Nef corresponding to 87% of the maximum target revolutions Nem, and the governor executes the speed control on a corresponding regulation line Fef.

When a command indicating that the throttle amount S' is 72% is output from the engine controller 60, the target revolutions of the engine 1 are set to the number of revolutions Ner corresponding to 72% of the maximum revolutions Nem, and the governor executes the speed control on a corresponding regulation line Fer.

Figure 3:
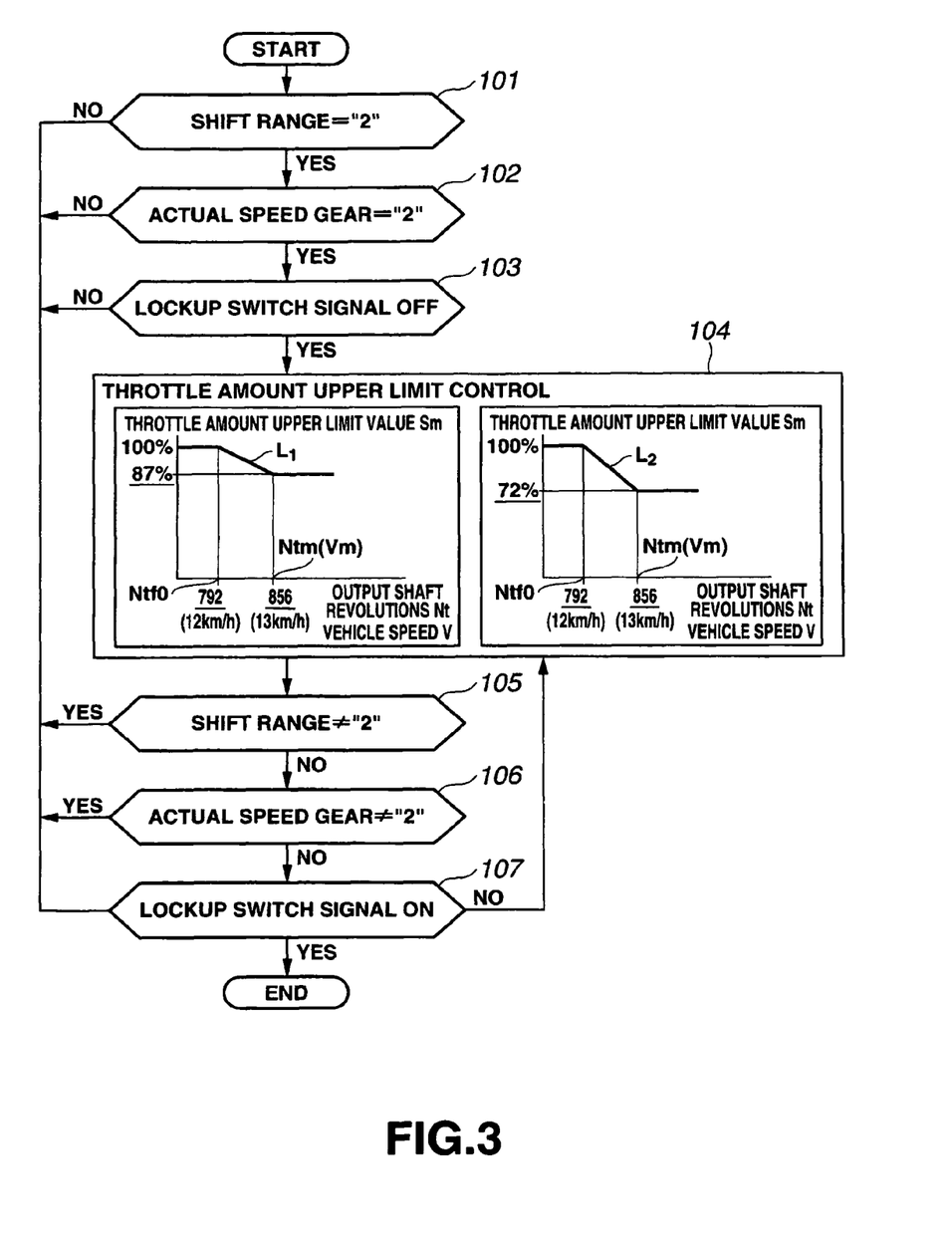
FIG. 3 is a flow chart showing the contents of processing performed by the controller of the embodiment.

FIG. 3 is a flow chart showing a procedure of processing performed by the transmission controller 50.

Figure 4B:
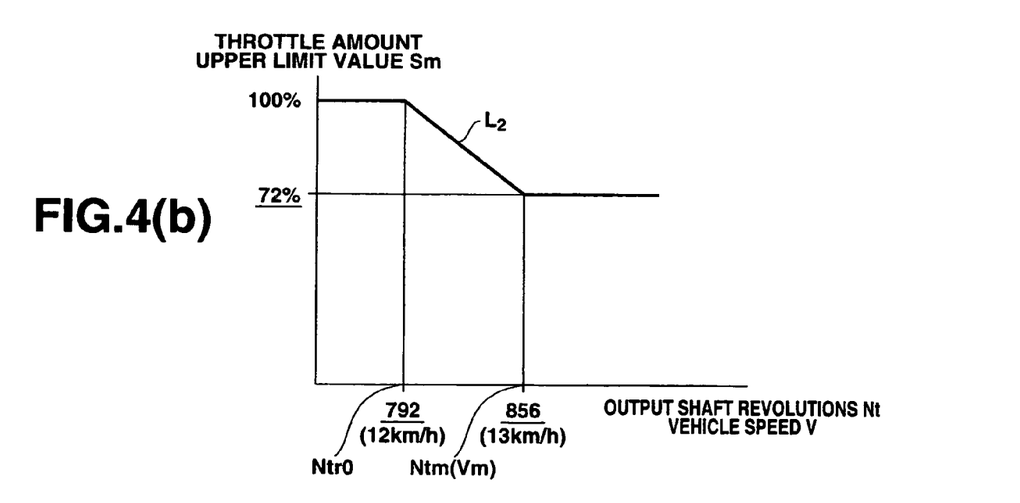

FIGS. 4(a), (b) are data tables showing correspondence relationships L1, L2 between transmission output shaft revolutions Nt (rpm; vehicle speed V) and a throttle amount upper limit value Sm. FIG. 4(a) is a diagram corresponding to a case that the wheel loader 100 is running at the forward second speed "F2", and FIG. 4(b) is a diagram corresponding to a case that the wheel loader 100 is running at the reverse second speed "R2"

Here, the wheel loader 100 is based on the assumption that "overrun protect control" is performed. The overrun protect control is control to automatically shift up to a higher speed gear than the maximum speed gear in the shift range to protect the clutch of the transmission 20 if the vehicle speed exceeds the upper limit vehicle speed of the maximum speed gear in the shift range.

For example, in a case where the shift range "2" is selected by the shift range lever 8, if the vehicle speed exceeds the upper limit vehicle speed Vm of the second speed gear which is the maximum speed gear of the shift range "2", the shift up to a higher speed gear than the maximum speed gear (second speed gear) in the shift range, e.g., the third speed gear, is automatically performed in order to protect the clutch of the transmission 20.

In this embodiment, when a low-speed gear change range (shift range "2") suitable for a work is selected by the shift range lever 8 and the speed gear clutch (second speed clutch 22) corresponding to the maximum speed gear (second speed gear) of the selected gear change range (shift range "2") in the speed gear clutches 21 to 24 is engaged, the throttle amount upper limit value Sm which restricts the number of revolutions Ne of the engine 1 is determined to obtain an upper limit vehicle speed Vm (output shaft revolutions Ntm) or less corresponding to the maximum speed gear (second speed gear), and it is output as a throttle amount correction command signal to the engine controller 60.

Specifically, it is judged first whether or not the present shift range is "2" based on the shift range signal indicating the operation position of the shift range lever 8 (step 101).

Then, it is judged based on the speed gear clutch pressure command signal generated by the transmission controller 50 whether or not the present selected and engaged actual speed gear is a second speed gear (second speed clutch 22) (step 102).

Then, it is judged based on the operation signal of the lockup clutch switch 9 whether or not the lockup clutch switch 9 is off (step 103).

When the shift range is "2" (judged YES in step 101), the actual speed gear is a second speed gear (second speed clutch 22) (judged YES in step 102) and the lockup clutch switch 9 is off (judged YES in step 103), the procedure moves to the next step 104 and the throttle amount upper limit control is performed so that "overrun protect control" does not function.

In step 104, the throttle amount upper limit value Sm is determined based on the contents of the data table as shown in FIGS. 4(a), 4(b).

First, it is judged based on the forward/reverse position signal "F" or "R" which indicates an operation position of the forward/reverse selecting lever 7, whether the wheel loader 100 is now performing forward running "F" or reverse running "R".

As a result, if it is judged that the wheel loader 100 is performing the forward running, the correspondence relationship L1 corresponding to the forward running and shown in FIG. 4(a) is selected.

FIG. 4(a) shows the correspondence relationship L1 between the transmission output shaft revolutions Nt taken along the horizontal axis and the throttle amount upper limit value Sm at the forward running taken along the vertical axis.

A range (a vehicle speed V of 12 km/h to 13 km/h) of revolutions Ntf0 to revolutions Ntm on the horizontal axis indicates a vehicle speed region covered by the second speed gear when running at the forward second speed "F2". When running at the forward second speed "F2", the upper limit vehicle speed Vm of the second speed gear is 13 km/h, and if the vehicle speed V exceeds actually the upper limit vehicle speed Vm, the overrun protect control functions to shift up automatically to the third speed gear corresponding to a higher speed.

As shown in FIG. 4(a), the correspondence relationship L1 has a characteristic L1 that with an increase of the vehicle speed V in the range (vehicle speed V of 12 km/h to 13 km/h) of the revolutions Ntf0 to the revolutions Ntm on the horizontal axis, the throttle amount upper limit value Sm lowers gradually from 100% to reach the upper limit vehicle speed Vm, and the throttle amount upper limit value Sm becomes 87%. The characteristic that the throttle amount upper limit value Sm is gradually decreased as the vehicle speed V is increased is provided in order to prevent the occurrence of a shock due to a sudden change. Occasionally, it is also possible to have a throttle amount upper limit value Sm of 87% in the entire speed region (the range of the revolutions Ntf0 to the revolutions Ntm (the vehicle speed V of 12 km/h to 13 km/h)) covered by the second speed gear.

Thus, even if the throttle amount S becomes 100% by depressing the accelerator pedal 11 to 100%, the throttle amount S is corrected by the throttle upper limit value Sm, and the restricted throttle amount S' is obtained. For example, even if the accelerator pedal 11 is depressed to 100%, the engine revolutions Ne are limited to the throttle amount S' of 87%, namely the revolutions Nef which are 87% of the maximum target revolutions Nem if the vehicle speed V is the upper limit vehicle speed Vm, and the vehicle speed V does not exceed the upper limit vehicle speed Vm of the second speed gear.

Thus, at the time of the forward second speed "F2", the throttle upper limit value Sm corresponding to the present detected revolutions Nt (the present vehicle speed V) of the vehicle speed sensor 10 is read based on the correspondence relationship L1 shown in FIG. 4(a) and output as a throttle amount correction command signal to the engine controller 60.

Similarly, if it is judged that the wheel loader 100 is reverse running, the correspondence relationship L2 corresponding to the reverse running and shown in FIG. 4(b) is selected.

FIG. 4(b) shows the correspondence relationship L2 with the transmission output shaft revolutions Nt taken on the horizontal axis and the throttle amount upper limit value Sm at reverse running taken on the vertical axis.

A range (vehicle speed V of 12 km/h to 13 km/h) of revolutions Ntr0 to revolutions Ntm on the horizontal axis indicates a vehicle speed region covered by the second speed gear when running at the reverse second speed "R2". When running at the reverse second speed "R2", the upper limit vehicle speed Vm of the second speed gear is 13 km/h, and if the vehicle speed V actually exceeds the upper limit vehicle speed Vm, the overrun protect control functions, and the shift up to the third speed gear corresponding to a higher speed is performed automatically.

As shown in FIG. 4(b), the correspondence relationship L2 has a characteristic L2 that the throttle amount upper limit value Sm becomes 72% when the vehicle speed V increases in a range (vehicle speed V of 12 km/h to 13 km/h) of the revolutions Ntr0 to the revolutions Ntm on the horizontal axis, the throttle amount upper limit value Sm decreases gradually from 100% to reach the upper limit vehicle speed Vm. The characteristic is determined such that the throttle amount upper limit value Sm is gradually decreased with the increase of the vehicle speed V in order to avoid the occurrence of a shock due to a sudden change. According to circumstances, it is also possible to have the throttle amount upper limit value Sm of 72% in the entire speed region (a range of the revolutions Ntr0 to the revolutions Ntm (vehicle speed V of 12 km/h to 13 km/h)) covered by the second speed gear.

Thus, even if the accelerator pedal 11 is depressed to 100% to have a throttle amount S of 100%, the throttle amount S is corrected by the throttle upper limit value Sm, and the limited throttle amount S' is obtained. For example, even if the accelerator pedal 11 is depressed to 100%, when the vehicle speed V is the upper limit vehicle speed Vm, the engine revolutions Ne are limited to the throttle amount S' of 72%, namely the revolutions Ner which are 72% of the maximum target revolutions Nem, and the vehicle speed V does not exceed the upper limit vehicle speed Vm of the second speed gear.

Thus, at the time of the reverse second speed "R2", the throttle upper limit value Sm corresponding to the present detected revolutions Nt (present vehicle speed V) of the vehicle speed sensor 10 is read based on the correspondence relationship L2 shown in FIG. 4(b) and output as a throttle amount correction command signal to the engine controller 60 (step 104).

Then, it is judged whether or not the conditions for cancelling the throttle amount upper limit control of the above-described step 104 have been established.

Specifically, it is judged whether or not the present shift range is other than "2" based on the shift range signal indicating the operation position of the shift range lever 8 (step 105).

Then, it is judged based on the clutch pressure command signal generated by the transmission controller 50 whether or not the present selected and engaged actual speed gear is other than the second speed gear (second speed clutch 22) (step 106).

Then, it is judged based on the operation signal of the lockup clutch switch 9 whether or not the lockup clutch switch 9 is on (step 107).

The throttle amount upper limit control is cancelled when the shift range is other than "2" (judged YES in step 105), the actual speed gear is other than the second speed gear (second speed clutch 22) (Judged YES in step 106) or the lockup clutch switch 9 is on (judged YES in step 107).

The engine controller 60 compares the contents of the throttle correction command signal input from the transmission controller 50, namely the throttle amount upper limit value Sm and the throttle amount S as a depressing operation amount of the accelerator pedal 11, generates the smaller throttle amount as a corrected throttle amount S' and controls the engine 1 so that the target revolutions according to the corrected throttle amount S' can be obtained.

As a result, when the wheel loader 100 is running at the forward second speed "F2" as shown in FIG. 2, the engine target revolutions decrease gradually with the increase of the vehicle speed V according to the characteristic L1 as indicated by arrow A, and when it reaches the upper limit vehicle speed Vm, the revolutions are limited to the revolutions Nef which are 87% of the maximum target revolutions Nem. Therefore, even if the accelerator pedal 11 is depressed to 100%, the revolutions of the engine 1 is limited to the revolutions Nef corresponding to 87% of the maximum revolutions Nem, and the vehicle speed V does not exceed the upper limit vehicle speed Vm of the second speed gear.

When the wheel loader 100 is running at the reverse second speed "R2", the engine target revolutions decrease gradually with an increase of the vehicle speed V according to a characteristic L2 as indicated by an arrow B and when it reaches the upper limit vehicle speed Vm, and the revolutions are limited to the revolutions Ner which are 72% of the maximum target revolutions Nem. Therefore, even if the accelerator pedal 11 is depressed to 100%, the revolutions of the engine 1 is limited to the revolutions Ner corresponding to 72% of the maximum revolutions Nem, and the vehicle speed V does not exceed the upper limit vehicle speed Vm of the second speed gear.

Thus, since the engine revolutions are controlled so that the vehicle speed V does not exceed the upper limit vehicle speed Vm of the second speed gear, even if the forward/reverse selecting operation lever 7 is operated in the V-shape loading to changeover from the forward running to the reverse running, a gear change is made to the reverse second speed "R2" while the speed gear is kept without shifting up from the forward second speed "F2" to the reverse third speed "R3". Similarly, even if the forward/reverse selecting lever 7 is operated to changeover from the reverse running to the forward running at the time of the V-shape loading, a gear change is made to the forward second speed "F2" while the same speed gear is kept without shifting up from the reverse second speed "R2" to the forward third speed "F3".

Thus, the braking effect by the low-speed gear (second speed gear) can be obtained as expected by the operator, and the work can be executed efficiently and swiftly. Since the engagement changeover between the forward clutch 25 and the reverse clutch 26 is not performed when the vehicle speed V exceeds the upper limit vehicle speed Vm of the second speed gear, a heat load applied to the clutch is decreased, the durability of the clutch is improved, the clutch capacity can be decreased, the clutch is made compact, and the cost is reduced.

In the above-described embodiment, one of conditions to start the throttle amount upper limit control is that the lockup clutch 4 is off, but such a condition may be omitted appropriately for a working vehicle which is not provided with the lockup clutch 4 or the like.

In the above embodiment, one of conditions to start the throttle amount upper limit control is that the shift range is positioned at "2", a reduction gear ratio or the like is different depending on the type of the working vehicle, and another shift range might be used at the time of the V-shape loading. Therefore, the condition of starting the throttle amount upper limit control may be positioned in another shift range. In other words, positioning in a shift range used for working at a low speed may be a condition for starting the throttle amount upper limit control.

In the embodiments described, it has been assumed that the working vehicle is a wheel loader, but the present invention can also be applied to other working vehicles such as forklifts if they are provided with a transmission.

BRIEF DESCRIPTION OF THE DRAWINGS

FIGS. 4(*a*) and 4(*b*) are diagrams showing storage data of throttle upper limit values used for the throttle upper limit control.

The invention claimed is:

1. An engine revolutions control device of a working vehicle, wherein
   the working vehicle includes power transmitting means for transmitting power from an engine to drive wheels through a transmission and for transmitting the engine power to a work machine through a hydraulic pump,
   the transmission includes
      a forward clutch for selecting a forward running gear,
      a reverse clutch for selecting a reverse running gear, and
      speed gear clutches each for selecting each speed gear, and
   the engine revolutions control device comprises:
      gear change range selection means for selecting a gear change range of a speed gear; and
      engine revolutions control means for limiting the revolutions of the engine to an upper limit vehicle speed or less corresponding to a maximum speed gear when a low-speed gear change range is selected by the gear change range selection means and a speed gear clutch corresponding to the maximum speed gear of the selected gear change range in the speed gear clutches is engaged.

2. An engine revolutions control device of a working vehicle provided with a torque converter and a lockup clutch which is parallel to the torque converter between an engine and a transmission,
   the transmission including,
      a forward clutch for selecting a forward running gear,
      a reverse clutch for selecting a reverse running gear, and
      speed gear clutches each for selecting each speed gear,
   and the engine revolutions control device comprising:
      gear change range selection means for selecting a gear change range of a speed gear; and
      engine revolutions control means for limiting the revolutions of the engine to an upper limit vehicle speed or less corresponding to a maximum speed gear when it is instructed to put the lockup clutch into a non-engaged state, a low-speed gear change range is selected by the gear change range selection means and the speed gear clutch corresponding to the maximum speed gear of the selected gear change range is engaged among the individual speed gear clutches.

3. The engine revolutions control device of a working vehicle according to claim 1, wherein the low-speed gear change range is a gear change range which has a second speed gear as the maximum speed gear.

4. The engine revolutions control device of a working vehicle according to claim 2, wherein the low-speed gear change range is a gear change range which has a second speed gear as the maximum speed gear.

5. An engine revolutions control method of a working vehicle, the method comprising:
   transmitting power of an engine to drive wheels through a transmission and transmitting the engine power to a work machine through a hydraulic pump; and
   when a low-speed gear change range is selected and a speed gear clutch corresponding to a maximum speed gear of the selected gear change range in the individual speed gear clutches is engaged, limiting the revolutions of the engine is limited to an upper limit vehicle speed or less corresponding to the maximum speed gear of the selected gear change range.

6. An engine revolutions control method of a working vehicle provided with a torque converter and a lockup clutch which is parallel to the torque converter between an engine and a transmission, the method comprising:
   limiting the revolutions of the engine to an upper limit vehicle speed or less corresponding to a maximum speed gear when it is instructed to put the lockup clutch into a non-engaged state, a low-speed gear change range is selected and the speed gear clutch corresponding to the maximum speed gear of the selected gear change range is engaged among the individual speed gear clutches.

7. The engine revolutions control method of a working vehicle according to claim 5, wherein the low-speed gear change range suitable for a work is a gear change range which has a second speed gear as the maximum speed gear.

8. The engine revolutions control method of a working vehicle according to claim 6, wherein the low-speed gear change range suitable for a work is a gear change range which has a second speed gear as the maximum speed gear.

* * * * *